(12) United States Patent
Ohtake et al.

(10) Patent No.: US 10,657,990 B2
(45) Date of Patent: May 19, 2020

(54) MAGNETIC HEAD AND DISK DEVICE HAVING GAP LAYERS WITH DIFFERENT MAGNETIC RELATIVE PERMEABILITIES

(71) Applicants: KABUSHIKI KAISHA TOSHIBA, Tokyo (JP); Toshiba Electronic Devices & Storage Corporation, Tokyo (JP)

(72) Inventors: Masaya Ohtake, Fujisawa Kanagawa (JP); Akihiko Takeo, Kokubunji Tokyo (JP); Naoyuki Narita, Fujisawa Kanagawa (JP); Gaku Koizumi, Yokohama Kanagawa (JP); Yusuke Tomoda, Kawasaki Kanagawa (JP); Tomoyuki Maeda, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 15/902,531

(22) Filed: Feb. 22, 2018

(65) Prior Publication Data

US 2019/0066717 A1    Feb. 28, 2019

(30) Foreign Application Priority Data

Aug. 29, 2017  (JP) ................................. 2017-164490

(51) Int. Cl.
*G11B 5/235* (2006.01)
*G11B 5/11* (2006.01)
(Continued)

(52) U.S. Cl.
CPC ................ *G11B 5/235* (2013.01); *G11B 5/11* (2013.01); *G11B 5/1278* (2013.01); *G11B 5/315* (2013.01); *G11B 5/3153* (2013.01); *G11B 5/667* (2013.01)

(58) Field of Classification Search
None
See application file for complete search history.

(56) References Cited

U.S. PATENT DOCUMENTS 8,837,087 B2   9/2014 Takeo et al.
9,142,228 B2   9/2015 Fujita et al.
(Continued)

FOREIGN PATENT DOCUMENTS

CN    104252877 A    12/2014
CN    104517615 A    4/2015
(Continued)

OTHER PUBLICATIONS

First Office Action dated Aug. 26, 2019 in corresponding Chinese Patent Application No. 201810010238.0 with machine English translation, 15 pages.
(Continued)

*Primary Examiner* — Craig A. Renner
(74) *Attorney, Agent, or Firm* — Kim & Stewart LLP

(57) ABSTRACT

A magnetic head includes a main magnetic pole, a write shield separated from the main magnetic pole by a write gap, a first side shield that is separated from the main magnetic pole by a first side gap, a second side shield that is separated from the main magnetic pole by a second side gap, a first layer that has a first magnetic relative permeability and is disposed in the write gap between the main magnetic pole and the write shield, and a second layer that has a second magnetic relative permeability and is disposed in the first side gap and the second side gap, wherein the first magnetic
(Continued)

relative permeability is smaller than the second magnetic relative permeability.

10 Claims, 6 Drawing Sheets

(51) Int. Cl.
  *G11B 5/31* (2006.01)
  *G11B 5/127* (2006.01)
  *G11B 5/667* (2006.01)

(56) References Cited

U.S. PATENT DOCUMENTS

| | | | | |
|---|---|---|---|---|
| 9,508,364 | B1* | 11/2016 | Tang et al. | G11B 5/235 |
| 9,691,415 | B2 | 6/2017 | Koui | |
| 9,870,786 | B2 | 1/2018 | Funayama et al. | |
| 9,886,971 | B2 | 2/2018 | Yamada et al. | |
| 2010/0315747 | A1* | 12/2010 | Matsumoto et al. | G11B 5/1278 360/246.2 |
| 2011/0075294 | A1 | 3/2011 | Fuchizaki et al. | |
| 2011/0116195 | A1* | 5/2011 | Cazacu et al. | G11B 5/193 360/319 |
| 2011/0268991 | A1 | 11/2011 | Benakli et al. | |
| 2014/0169146 | A1* | 6/2014 | Yin et al. | G11B 5/1278 360/125.03 |
| 2015/0002959 | A1* | 1/2015 | Basu et al. | G11B 5/315 360/125.03 |
| 2017/0092300 | A1* | 3/2017 | Lu et al. | G11B 5/315 |

FOREIGN PATENT DOCUMENTS

| | | |
|---|---|---|
| CN | 106448705 A | 2/2017 |
| CN | 106710607 B | 3/2019 |
| JP | H08-96325 A | 4/1996 |
| JP | 2017-117502 A | 6/2017 |

OTHER PUBLICATIONS

Notice of Reasons for Refusal dated Mar. 3, 2020 in corresponding Japanese Patent Application No. 2017-164490 with machine English translation, 6 pages.

* cited by examiner

MAGNETIC HEAD AND DISK DEVICE HAVING GAP LAYERS WITH DIFFERENT MAGNETIC RELATIVE PERMEABILITIES

CROSS-REFERENCE TO RELATED APPLICATION

This application is based upon and claims the benefit of priority from Japanese Patent Application No. 2017-164490, filed Aug. 29, 2017, the entire contents of which are incorporated herein by reference.

FIELD

Embodiments described herein relate generally to a magnetic head and a disk device having the same.

BACKGROUND

A magnetic disk drive includes a disk-shaped recording medium disposed in a casing, that is, a magnetic disk and a magnetic head that reads and writes information from/to the magnetic disk. The magnetic head includes, for example, a recording head and a read head (reproducing element). The recording head includes a main magnetic pole that generates a recording magnetic field, a write shield, and side shields that face each other with a gap between the main magnetic pole.

In such a recording head, recording resolution (recording density) is largely influenced by a distance (gap length) between the main magnetic pole and the shield. With increasing recording density, the gap length tends to become smaller. However, when the gap length becomes smaller, the write shield can be magnetically saturated due to the magnetic field generated from the main magnetic pole. As a result, the write shield does not function effectively as a shield. In this case, the recording resolution and the recording density of the recording head are adversely affected.

DETAILED DESCRIPTION

Figure 1:
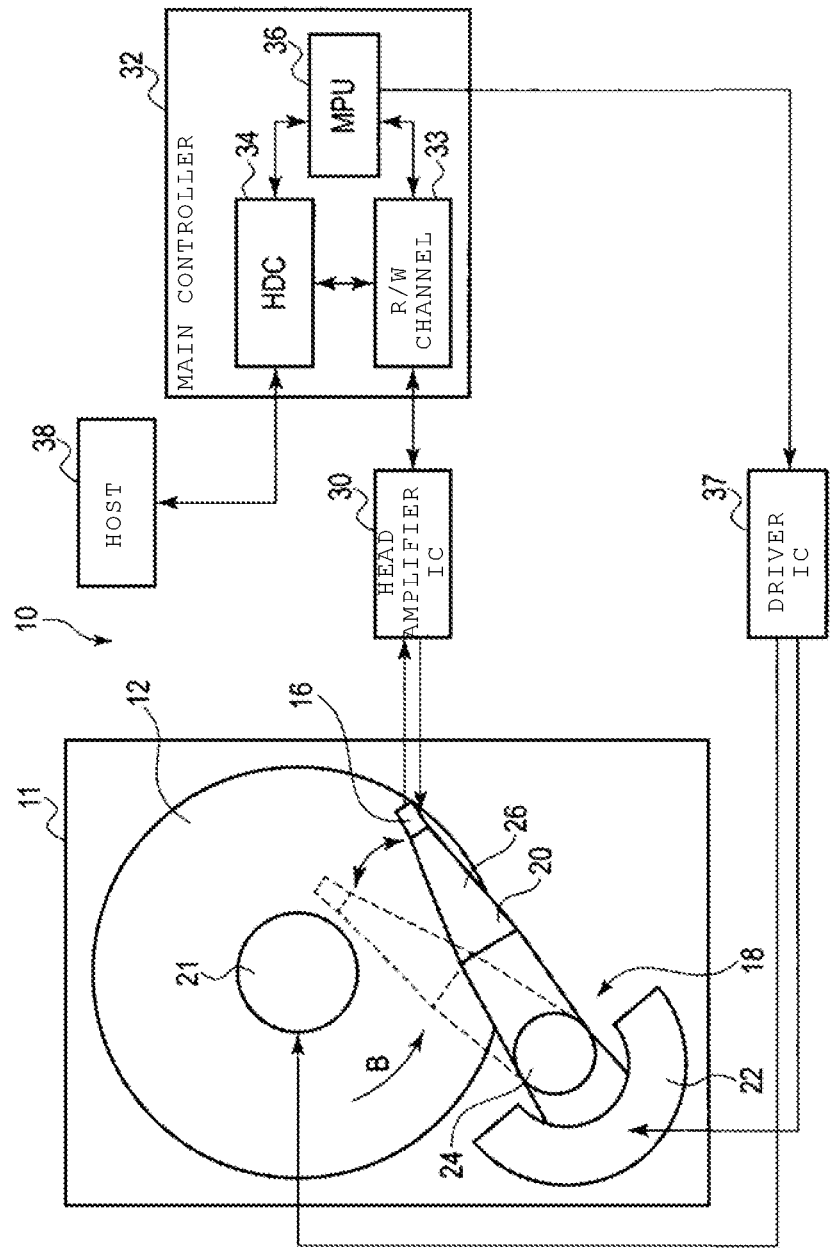
FIG. 1 is a block diagram schematically illustrating a hard disk drive (HDD) according to a first embodiment.

According to embodiments provided herein, a magnetic recording head is capable of preventing saturation of a shield and improving a recording density. A magnetic disk device having such a magnetic recording head is also described.

In general, according to one embodiment, a magnetic head includes a main magnetic pole that generates a recording magnetic field, a write shield disposed adjacent to the main magnetic pole and separated from the main magnetic pole by a write gap, a first side shield that is disposed on a first side of the main magnetic pole in a track width direction from the main magnetic pole and is separated from the main magnetic pole by a first side gap, a second side shield that is disposed on a second side of the main magnetic pole in the track width direction from the main magnetic pole and is separated from the main magnetic pole by a second side gap, a first layer that has a first magnetic relative permeability and is disposed in the write gap between the main magnetic pole and the write shield, and a second layer that has a second magnetic relative permeability and is disposed in the first side gap and the second side gap, wherein the first magnetic relative permeability is smaller than the second magnetic relative permeability.

With reference to the drawings, disk devices according to embodiments will be described.

Note that the disclosure is merely an example, and any modification and variation which can be easily conceived by a person ordinarily skilled in the art without departing from the spirit of the embodiments naturally falls within the scope of the present invention. To further clarify explanation, for example, the width, thickness, or shape of each structure may be schematically shown in the drawings, and are not to scale. Note that the drawings are merely examples and do not limit the interpretation of the present invention. In the specification and drawings, elements which are identical to previously-described elements are denoted by the same reference numbers. Thus, the detailed explanation of such elements may be omitted.

First Embodiment

A hard disk drive (HDD) according to an embodiment will be described in detail. FIG. 1 is a block diagram schematically illustrating an HDD according to a first embodiment, and FIG. 2 is a side view illustrating a flying state of a magnetic head and a magnetic disk of the HDD.

As illustrated in FIG. 1, an HDD 10 is a disk device that includes a rectangular housing 11, a magnetic disk 12 as a recording medium disposed in the housing 11, a spindle motor 21 supporting and rotating the magnetic disk 12, and a plurality of magnetic heads 16 configured to write/read data on/from the magnetic disk 12. Further, the HDD 10 includes a head actuator 18 that moves each magnetic head 16 onto an arbitrary track on the magnetic disk 12 for positioning. The head actuator 18 includes a carriage assembly 20 configured to movably support the magnetic heads 16 and a voice coil motor (VCM) 22 configured to rotate the carriage assembly 20.

The HDD 10 includes a head amplifier IC 30, a main controller 32 and a driver IC 37. The head amplifier IC 30 is disposed on, for example, the carriage assembly 20, and is electrically connected to the magnetic head 16. For example, the main controller 32 and driver IC 37 can be formed on a control circuit board (not illustrated) disposed on a back surface side of the housing 11. The main controller 32 includes an R/W channel 33, a hard disk controller (HDC) 34, and a microprocessor (MPU) 36. The main controller 32 is electrically connected to the magnetic heads 16 via the head amplifier IC 30. The main controller 32 is also electrically connected to the VCM 22 and spindle motor 21 via the driver IC 37. The HDC 34 is connectable to a host computer 38.

Figure 2:
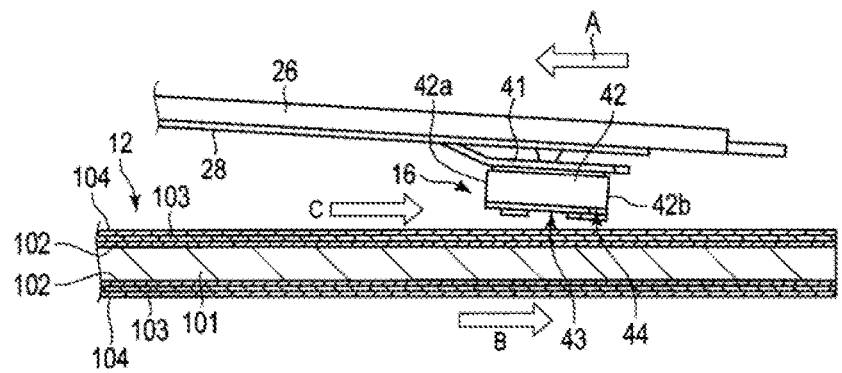
FIG. 2 is a side view illustrating a magnetic head, a suspension, and a magnetic disk in the HDD.

As illustrated in FIGS. 1 and 2, the magnetic disk 12 is a perpendicular magnetic medium. The magnetic disk 12 includes a substrate 101 formed of a nonmagnetic substance and in the shape of a disc having a diameter of approximately 2.5 inches (6.35 cm), for example. On each surface of the substrate 101, a soft magnetic layer 102, a perpendicular magnetic recording layer 103, and a protection film 104, are sequentially stacked in this order. The soft magnetic layer 102 is an under layer made of a material exhibiting soft magnetic characteristics, and the perpendicular magnetic recording layer 103 has magnetic anisotropy in a direction perpendicular to the surface of the magnetic disk 12. The magnetic disk 12 is coaxially fitted to a hub of the spindle motor 21. The magnetic disk 12 is rotated in a direction of the arrow B at a predetermined speed by the spindle motor 21.

The carriage assembly 20 includes a bearing unit 24 rotatably fixed to the housing 11 and a plurality of suspensions 26 extending from the bearing unit 24. As illustrated in FIG. 2, each of the magnetic heads 16 is supported on an extendable end of each suspension 26. Each of the magnetic heads 16 is electrically connected to the head amplifier IC 30 via a wiring member 28 disposed on the carriage assembly 20.

As illustrated in FIG. 2, each of the magnetic heads 16 is formed as a flying head, and includes a slider 42 formed in a substantially rectangular parallelepiped shape and a writing/reading head portion 44 formed at an end of a downstream (i.e., trailing) side of the slider 42. The slider 42 is formed of, for example, a sintered body of alumina and titanium carbide (AlTiC). The head portion 44 is formed to include a plurality of thin films that are stacked on each other. The magnetic head 16 is fixed to a gimbal spring 41 disposed at a tip end of the suspension 26.

The slider 42 has a rectangular disk-facing surface (recording medium-facing surface or air bearing surface (ABS)) 43 facing the surface of the magnetic disk 12. The slider 42 floats over the surface of the magnetic disk 12 by a predetermined amount by airflow C present between the surface of the disk and the ABS 43 that is due to the rotation of the magnetic disk 12. A direction of the airflow C coincides with a rotation direction B of the magnetic disk 12. The slider 42 includes a leading end 42a located on an upstream side of the airflow C, and a trailing end 42b located on a downstream side of the airflow C. During rotation of the magnetic disk 12, the magnetic head 16 travels in a direction of the arrow A (i.e., the head traveling direction) with respect to the magnetic disk 12, that is, in a direction opposite to the rotation direction B of the magnetic disk 12.

Figure 3:
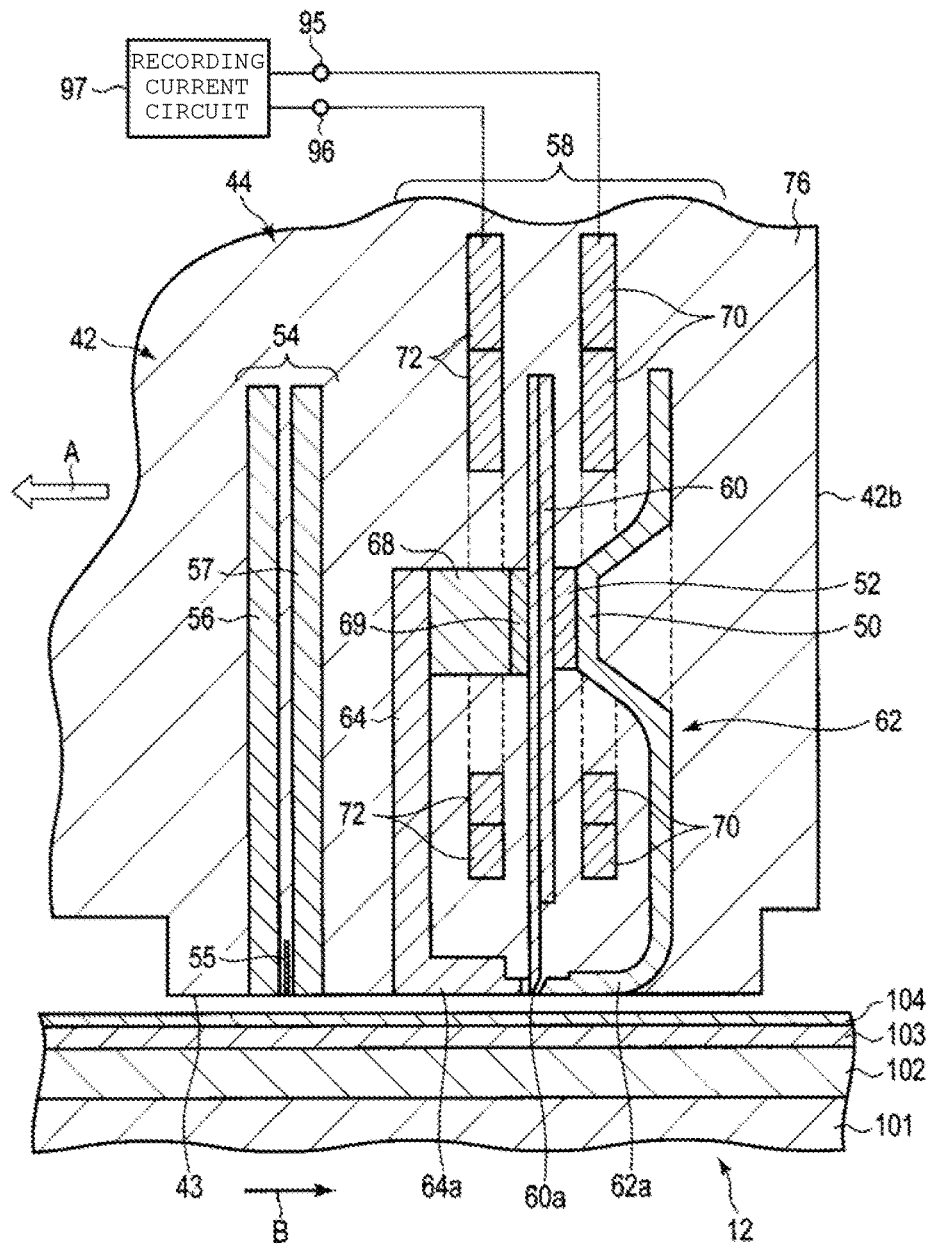
FIG. 3 is an enlarged cross-sectional view of a head portion of the magnetic head.

FIG. 3 is an enlarged cross-sectional view illustrating the head portion 44. As illustrated in FIG. 3, the head portion 44 includes a reproducing head (read head) 54 and a recording head (write head) 58 which are formed on the trailing end 42b of the slider 42 by a thin-film process and are formed as a separable magnetic head. The read head 54 and the write head 58 are covered with a non-magnetic protective insulating film 76 except a portion exposed to the ABS 43 of the slider 42. The protective insulating film 76 is formed on surfaces of or is included in the head portion 44.

The read head 54 includes a magnetic film 55 having magnetoresistance and shield films 56 and 57. The shield film 57 is disposed on the trailing side of the magnetic film 55 and the shield film 56 is disposed on the leading side of the magnetic film 55, so as to sandwich the magnetic film 55. Lower ends of magnetic film 55 and the shield films 56 and 57 are exposed on the ABS 43 of the slider 42 as shown.

Figure 4:
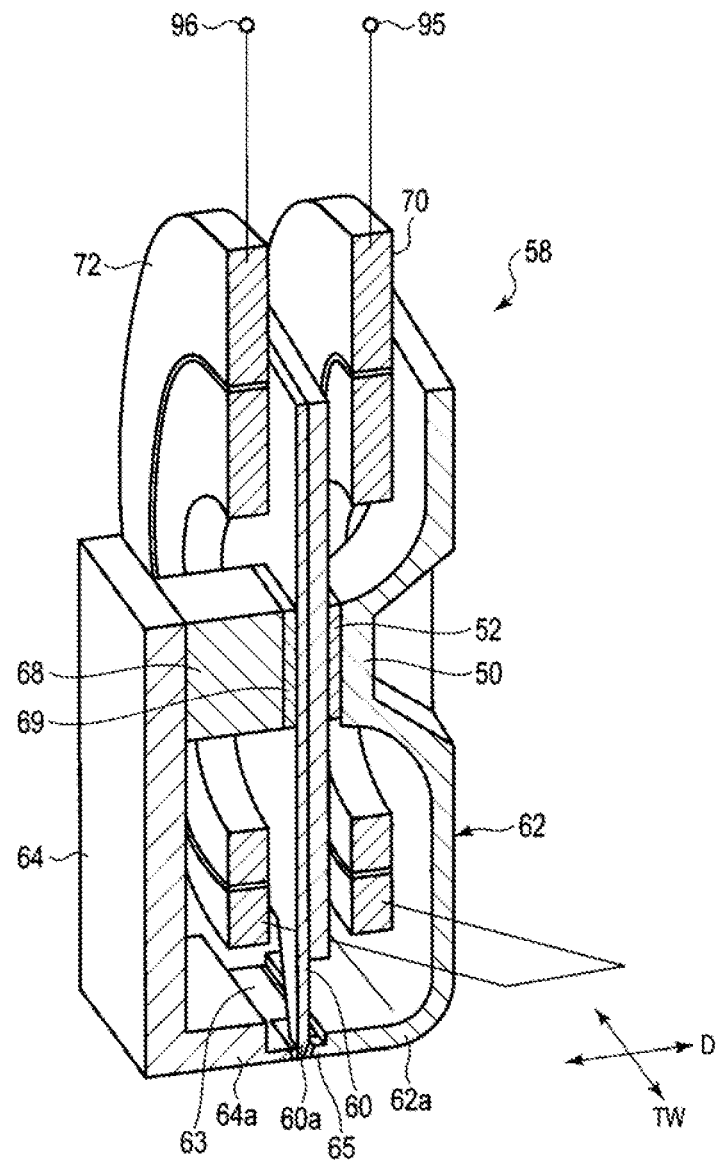
FIG. 4 is a partial cross-sectional perspective view illustrating the main components of a recording head in the magnetic head.
Figure 5:
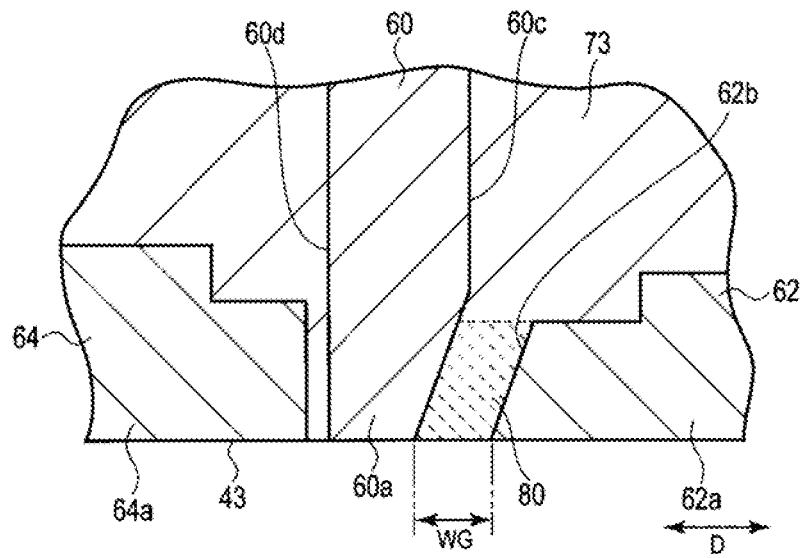
FIG. 5 is an enlarged cross-sectional view of the recording head of FIG. 4 illustrating a tip end of the recording head.
Figure 6:
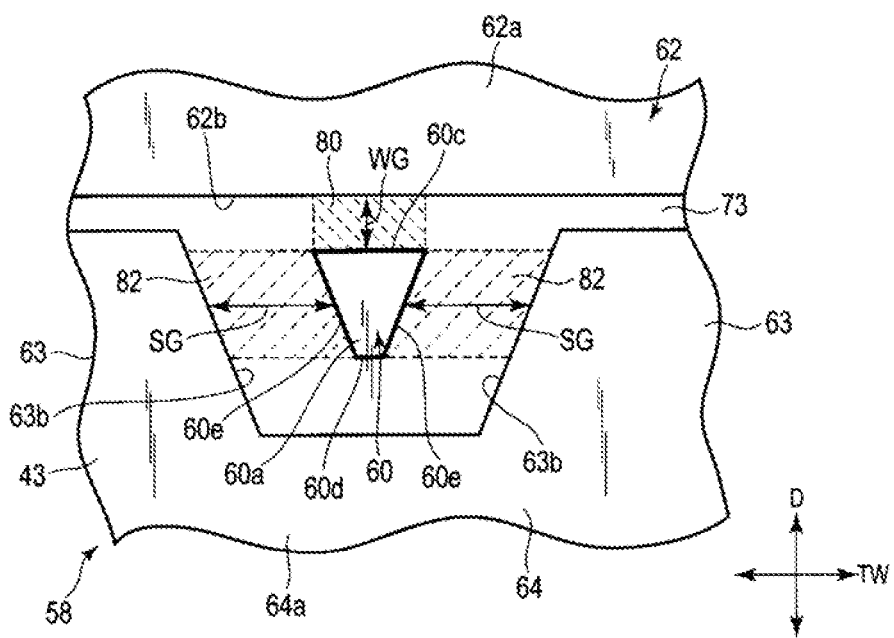
FIG. 6 is a plan view of the recording head as viewed from an ABS.

The write head 58 is disposed on the trailing end 42b of the slider 42 relative to the read head 54. FIG. 4 is a partial cross-sectional perspective view illustrating the main components of the recording head, FIG. 5 is an enlarged cross-sectional view illustrating a tip end 60a of the write head 58, and FIG. 6 is an enlarged plan view illustrating the write head 58 as viewed from the ABS 43.

As illustrated in FIGS. 3 and 4, the write head 58 includes a main magnetic pole 60 made of a high saturation magnetic flux density material, a trailing shield (write shield)) 62 made of a soft magnetic material, a pair of side shields 63, and a leading shield 64. The main magnetic pole 60 generates a recording magnetic field in a direction perpendicular to the surface of the magnetic disk 12. The trailing shield 62 is disposed with a write gap WG (which is a gap length in a down-track direction D) on the trailing side of the main magnetic pole 60, and is included in the write head 58 to facilitate closure of a magnetic path via the soft magnetic layer 102 in the magnetic disk 12 directly below the main magnetic pole 60. The pair of side shields 63 are positioned to face each other with side gaps SG on both side surfaces of the main magnetic pole 60 in a track width direction TW. Specifically, for each side shield 63, a side gap SG is disposed between a side surface 63b of the side shield and a corresponding side surface 60e of the main magnetic pole 60, where the side gap SG separated the side shield 63 from the main magnetic pole 60 in the track width direction TW. Furthermore, the leading shield 64 is positioned so that a gap (not labeled) is disposed between the leading shield 64 and the main magnetic pole 60 on the leading side of the main magnetic pole 60. Similarly, the trailing shield 62 is positioned so that the write gap WG is disposed between the trailing shield 62 and the main magnetic pole 60 on the trailing side of the main magnetic pole 60. In the first embodiment; the side shields 63 and the leading shield 64 may be integrally formed as a single component of a soft magnetic material. The leading shield has an L-shape with a lower end 64a that extends in a direction towards the tip end 62a of the trailing shield 62.

The trailing shield 62 is formed in a substantially L-shape (when viewed from the side as in FIG. 4) and has a first connection portion 50 (shown in FIGS. 3 and 4) coupled to the main magnetic pole 60. The first connection portion 50 is coupled via a nonconductor 52 to an upper part of the main magnetic pole 60, that is, an upper part of the main magnetic pole 60 that is positioned farther away from the disk-facing surface 43 than another part of the main trailing shield 60. The leading shield 64 has a first connection portion 68 that is coupled to the main magnetic pole 60 via a nonconductor (insulator) 69 at a location that is farther away from the magnetic disk 12 than another part of the leading shield 64. The first connection portion 68 is formed of, for example, a soft magnetic material, and forms a magnetic circuit together with the main magnetic pole 60 and the leading shield 64. In addition, at the location of the first connection portion 68, the main magnetic pole 60 and the leading shield 64 are electrically insulated from each other by the insulator 69.

The write head 58 includes a first recording coil 70 and a second recording coil 72 for allowing a magnetic flux to flow to the main magnetic pole 60. The first recording coil 70 is wound around a first magnetic core including the main magnetic pole 60 and the trailing shield 62, and the second recording coil 72 is wound around a second magnetic core including the main magnetic pole 60 and the leading shield 64. The first recording coil 70 and the second recording coil 72 are connected to terminals 95 and 96, respectively, and these terminals 95 and 96 are connected to a recording current circuit 97. The second recording coil 72 is connected to the first recording coil 70 in series. When a signal is written to the magnetic disk 12, a predetermined current is supplied to the first recording coil 70 and the second recording coil 72 from the recording current circuit 97, whereby a magnetic flux flows to the main magnetic pole 60 and a magnetic field is generated.

As illustrated in FIGS. 3 to 6, the main magnetic pole 60 extends substantially perpendicularly to the surface of the magnetic disk 12 and the ABS 43. The tip end 60a of the main magnetic pole 60, which is formed on the ABS 43 end of the main magnetic pole 60, is tapered narrowly (in a funnel shape) toward the ABS 43. The tip end 60a of the main magnetic pole 60 includes a trailing-side surface 60c located on the trailing side of the main magnetic pole 60, a leading-side surface 60d opposite to the trailing-side end surface, and the two side surfaces 60e (the latter are shown in FIG. 6). The leading-side surface 60d is located on the leading side of the main magnetic pole 60. A surface of the tip end 60a of the main magnetic pole 60 is exposed to the ABS 43 of the slider 42. In the tip end 60a, the trailing-side surface 60c extends obliquely away from ABS 43 with respect to a direction perpendicular to the ABS 43, as shown in FIG. 5. Similarly, to form the narrowly tapered funnel shape of tip end 60a, both side surfaces 60e extend obliquely away from ABS 43 with respect to a direction perpendicular to the ABS 43, and also with respect to a central axis of the main magnetic pole 60. That is, both side surfaces 60e extend obliquely away from ABS 43 in the track width direction TW.

A tip end 62a of the trailing shield 62 is formed in a slender rectangular shape in cross section, and has an extended tip portion 65, as shown in FIGS. 3 and 4. A lower end surface of the trailing shield 62 is exposed to the ABS 43 of the slider 42, as shown in FIGS. 5 and 6. A leading-side surface 62b of the tip end 62a extends along (i.e., substantially parallel to) the track width direction TW, and is the surface of tip end 62a that faces the main magnetic pole 60. The leading-side surface 62b extends away from the ABS 43 and obliquely with respect to the direction perpendicular to the ABS 43, as shown in FIG. 5. The write gap WG is disposed between the leading-side surface 62b of the tip end 62a of the trailing shield 62 and the trailing-side surface 60c of the tip end 60a of the main magnetic pole 60. In addition, the leading-side surface 62b of the tip end 62a is substantially parallel to the trailing-side surface 60c of the tip end 60a. The trailing-side surface 60c of the main magnetic pole 60 and the leading-side surface 62b of the trailing shield 62 may extend in the direction perpendicular to the ABS 43 (i.e., out of the page in FIG. 5 and in FIG. 6).

In the first embodiment, the pair of side shields 63 are formed from the same soft magnetic material as the leading shield 64, and are formed integrally with the leading shield 64 as a single body. In addition, the pair of side shields 63 extend from the leading shield 64 toward the trailing shield 62, as shown in FIG. 6. Thus, the side shields 63 are disposed between leading shield 64 and the trailing shield 62, in the down-track direction D. Each of the pair of side shields 63 is physically separated via a side gap SG from the main magnetic pole 60 on one side of the main magnetic pole 60 in the track width direction TW, and are magnetically and electrically coupled to the leading shield 64. Specifically, one of the side shields 63 is separated from the main magnetic pole 60 by one side gap SG and the other of the side shields 63 is separated from the main magnetic pole 60 by the other side gap SG, as shown in FIG. 6. For each of the side shields, a side surface 63b is positioned substantially in parallel with a corresponding side surface 60e of the main magnetic pole 60 with a gap SG therebetween. A tip end surface of the side shield 63 is exposed and forms a portion of the ABS 43.

As illustrated in FIGS. 5 and 6, a protective insulating film 73 is disposed in a space between the main magnetic pole 60 and the tip end 62a of the trailing shield 62, in a space between the main magnetic pole 60 and the leading shield 64, and in a space between the main magnetic pole 60 and the side shields 63. The protective insulating film 73 is made of a non-magnetic insulator, for example, alumina or silicon oxide.

In the first embodiment, a non-magnetic or magnetic first layer 80 is filled in the write gap WG between the main magnetic pole 60 and the trailing shield 62. Additionally, a non-magnetic or magnetic second layer 82 is disposed within and fills the side gap SG between the main magnetic pole 60 and each of the side shields 63. Magnetic relative permeability A of the first layer 80 is smaller than the magnetic relative permeability B of the second layer 82, and is set to satisfy the relation of A<B, where magnetic relative permeability is the measure of the ability of a material to support the formation of a magnetic field within itself. Furthermore, the difference between the magnetic relative permeability A of the first layer 80 and the magnetic relative permeability B of the second layer 82 is preferably 2 or more. The first layer 80 can be formed using, for example, Fe, Co, or Ni. The second layer 82 can be formed using, for example, Fe, Co, or Ni.

According to the magnetic head 16 configured as described above, the first layer 80 and the second layer 82 for satisfying the relation of the magnetic relative permeability A<B are disposed between the shields of the write head 58, thereby adjusting a magnetic flux flowing toward the side shield 63 during the magnetic recording. That is, the smaller magnetic relative permeability of layer 80 relative to the magnetic relative permeability of layer 82 adjusts the magnetic flux to actively flow toward the side shield 63. Thus, even when the write gap WG between the main magnetic pole 60 and the trailing shield 62 becomes narrow, it is possible to reduce the magnetic flux flowing directly from the main magnetic pole 60 toward the write shield 62 and to prevent magnetic saturation of the write shield 62. Accordingly, it is possible to improve a recording density while maintaining the functionality of the write shield 62 as a magnetic shield.

Figure 7:
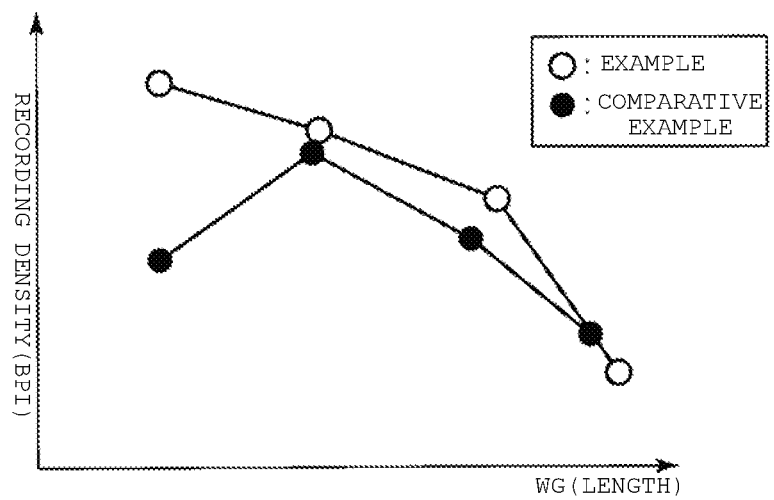
FIG. 7 is a diagram illustrating a relation between a gap length and a recording density for the recording head and a magnetic head according to a comparative example.

FIG. 7 illustrates results obtained by measuring a relation between a length of the write gap WG and a recording density (resolution) (such as bits per inch, or BPI) in the down-track direction D for the magnetic head according to the first embodiment and a magnetic head according to a comparative example. The magnetic head of the comparative example is a conventional magnetic head that does not include the first layer 80 and the second layer 82. That is, the magnetic head of the comparative example is a magnetic head in which the protective insulating film is disposed over the entire gap between the main magnetic pole and the write shield.

As illustrated in FIG. 7, for the magnetic head of the comparative example, as the distance (write gap WG) between the main magnetic pole and the trailing shield becomes narrow, the recording density can be improved up to a certain distance, but then, as the trailing shield is saturated, the recording density can decreases. That is, when the write gap WG is too narrow, the trailing shield is magnetically saturated and the recording density that is possible for the magnetic head of the comparative example deteriorates.

In contrast, according to the magnetic head of the first embodiment, it is understood that even when the distance (write gap WG) between the main magnetic pole and the trailing shield becomes narrow, the recording density continues to improve. This is because the magnetic flux can be released to the side shield, the trailing shield does not become magnetically saturated, and the recording density can be improved.

In light of the above, according to the first embodiment, it is possible to obtain a magnetic recording head capable of preventing the saturation of the shield and improving the recording density and a magnetic disk device having such a magnetic recording head.

As long as the first layer and the second layer of the recording head have magnetic relative permeabilities that satisfy the relation: magnetic relative permeability A<B, any suitable materials other than the materials described in the first embodiment can be selected for the first layer and second layer.

Magnetic heads and disk devices according to other embodiments will be described below. In the embodiments described below, the same reference numerals are given to similar components already described in the first embodiment, and the detailed description thereof is simplified or omitted. The components different from those of the first embodiment will be described in detail.

Second Embodiment

Figure 8:
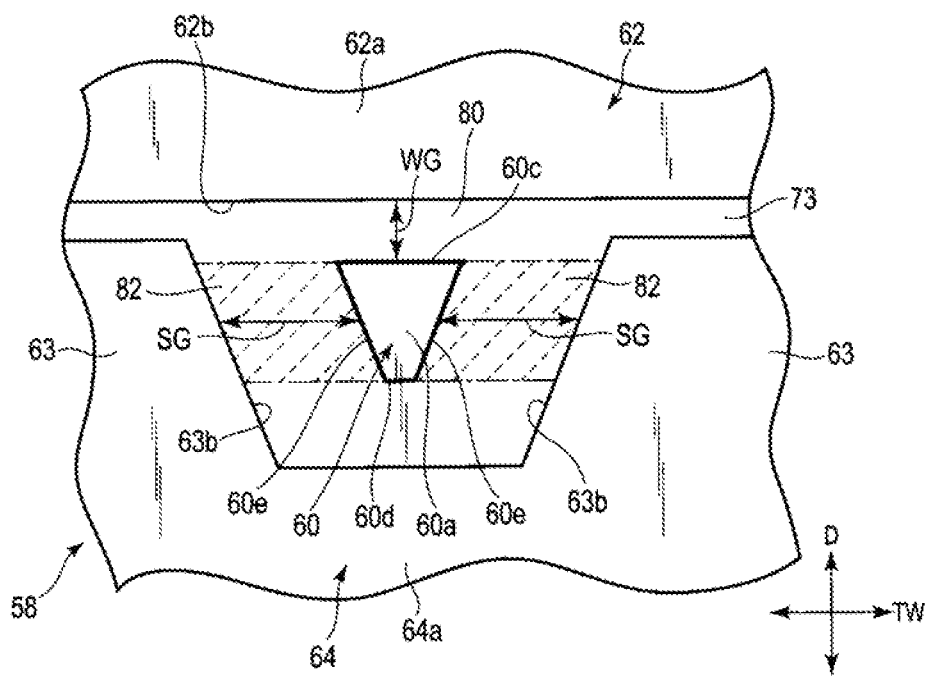
FIG. 8 is a plan view of a magnetic head according to a second embodiment as viewed from the ABS.

FIG. 8 is a plan view of a recording head according to a second embodiment, in which a tip end of the recording head and an ABS of the recording head are viewed. In the second embodiment, a first layer 80 is disposed between a main magnetic pole 60 and a trailing shield 62 of a write head 58 and fills a write gap WG. In the second embodiment, the first layer 80 is formed with the same layer as a surrounding protective insulating film 73 and has a magnetic relative permeability A of 1. A second layer 82 fills a side gap SG between the main magnetic pole 60 and each of side shields 63, and is formed of a magnetic layer or a weak magnetic layer having a magnetic relative permeability B that is greater than 1. The second layer 82 can be formed using, for example, Fe, Co, or Ni. The difference between the magnetic relative permeability A of the first layer 80 and the magnetic relative permeability B of the second layer 82 is preferably 2 or more. In the second embodiment, other configurations of the write head 58 and other configurations of the magnetic head are similar to those of the first embodiment described above.

According to the magnetic head configured as described above, the first layer 80 and the second layer 82 satisfy the relation of the magnetic relative permeability A<B, and are disposed between the shields of the write head 58 as shown in FIG. 8. As a result, a magnetic flux flowing toward the side shield 63 during magnetic recording is increased. Thus, even when the write gap WG between the main magnetic pole 60 and the trailing shield 62 becomes narrow, it is possible to reduce the magnetic flux flowing directly from the main magnetic pole 60 toward write shield 62, thereby preventing magnetic saturation of the write shield 62. Accordingly, it is possible to improve a recording density that can be attained by the write head 58 while maintaining a shield function of the write shield 62.

Third Embodiment

Figure 9:
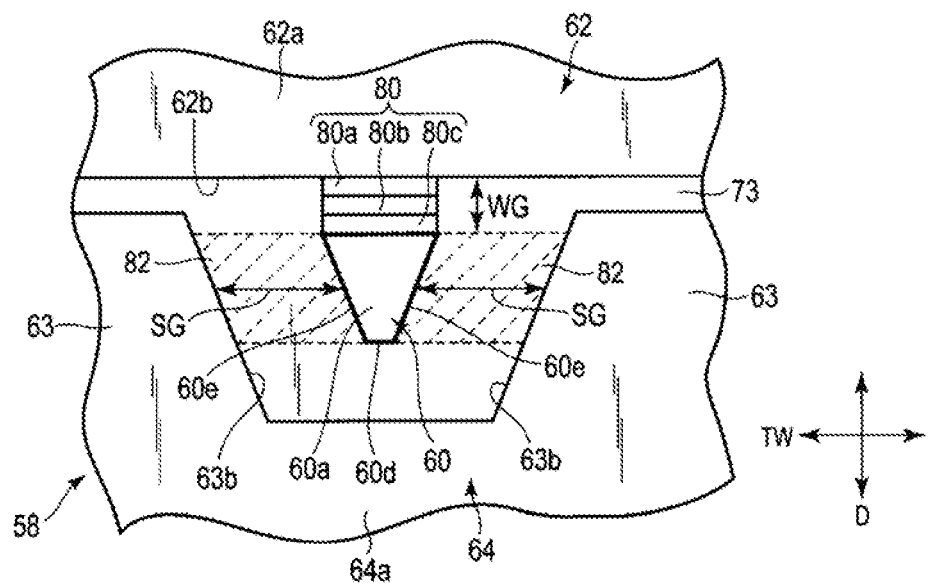
FIG. 9 is a plan view of a magnetic head according to a third embodiment as viewed from the ABS.
Figure 10:
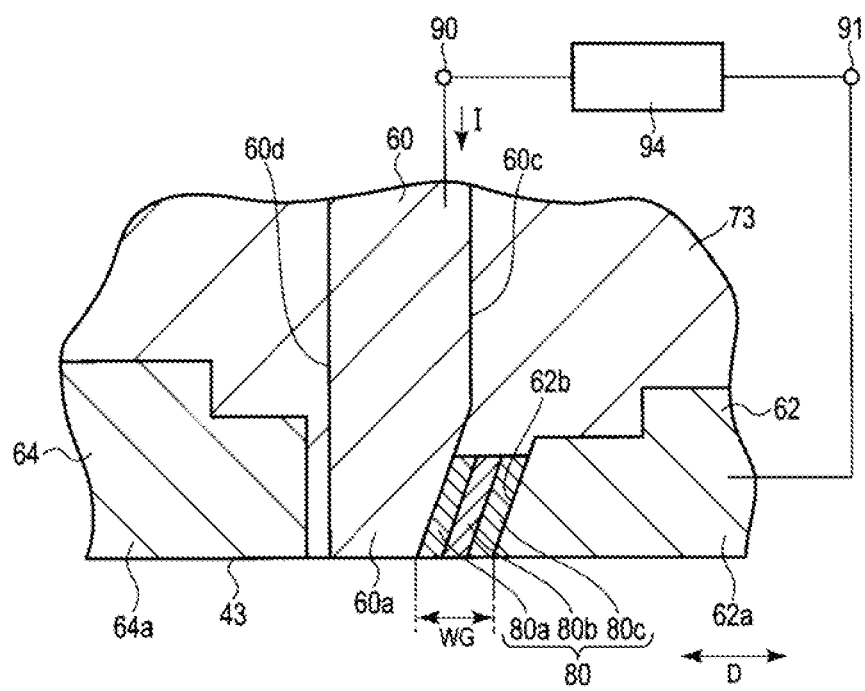
FIG. 10 is an enlarged cross-sectional view illustrating a tip end of the magnetic head according to the third embodiment.

FIG. 9 is a plan view of a recording head according to a third embodiment, in which a tip end of the recording head and an ABS of the recording head are viewed, and FIG. 10 is a cross-sectional view illustrating the tip end of the recording head according to the third embodiment.

In the third embodiment, a first layer 80 is disposed in and fills a write gap WG between a main magnetic pole 60 and a trailing shield 62 of a write head 58 is used as a magnetic flux control layer, where the first layer includes a plurality of stacked conductive layers. The magnetic flux control layer includes, for example, a first control layer 80a, a second control layer 80b, and a third control layer 80c that are sequentially stacked from the main magnetic pole 60 toward the trailing shield 62. The first control layer 80a can be formed using a material, for example, Cu, Au, Ag, Al, Ir, or an NiAl alloy which has a metal phase and does not interfere with spin conduction. The second control layer 80b can include a metal layer and be formed using a magnetic metal selected from the group consisting of Fe, Co, and Ni and a soft magnetic metal alloy containing at least one of Fe, Co, and Ni. The third control layer 80c can be formed using a material which is non-magnetic metal and blocks spin conduction. Specifically, the third control layer 80c can be formed of at least one selected from the group consisting of Ta, Ru, Pt, W, and/or Mo or an alloy containing at least one of thereof. The first control layer 80a and the third control layer 80c may also be swapped in position and therefore stacked in reverse order to that shown in FIG. 10.

A tip end 60a of the main magnetic pole 60 and a tip end 62a of the trailing shield 62 are electrically connected to each other via the magnetic flux control layer 80.

A second layer 82 is filled in a side gap SG between the main magnetic pole 60 and each of side shields 63. The second layer 82 can be formed using, for example, alumina.

As illustrated in FIG. 10, connection terminals 90 and 91 are connected to the main magnetic pole 60 and the trailing shield 62, respectively, so that a current flows through the main magnetic pole 60 and the trailing shield 62. A controller of the HDD has a power supply 94 connected to the connection terminals 90 and 91. An electric circuit is formed in which a current flows through the connection terminal 90, the main magnetic pole 60, the magnetic flux control layer 80, the trailing shield 62, and the connection terminal 91.

When the current flows to the magnetic flux control layer 80 from the power supply 94 via the main magnetic pole 60 and the trailing shield 62, the magnetic flux control layer 80 generates a magnetic flux in a direction opposite that of the magnetic flux from the main magnetic pole 60 to the trailing shield 62. As a result, the magnetic relative permeability A of the magnetic flux control layer 80 is lower than the magnetic relative permeability of air, and substantially lower than magnetic relative permeability B of the second layer 82. Accordingly, the magnetic relative permeability satisfies the relation of A<B.

In the third embodiment, other configurations of the write head 58 and the magnetic head are similar to those of the magnetic head and the recording head in the first embodiment described above. In the third embodiment, a magnetic flux flowing toward the side shield 63 during the magnetic recording is also increased. Thus, even when the write gap WG between the main magnetic pole 60 and the trailing shield 62 is narrow, it is possible to reduce the magnetic flux flowing directly from the main magnetic pole 60 toward write shield 62 and to prevent magnetic saturation of the write shield 62. Accordingly, it is possible to improve a recording density of the write head 58 while maintaining the magnetic shield functionality of the write shield 62.

The magnetic flux control layer can be formed by selecting various materials other than the materials in the embodiments described above. The magnetic flux control layer has the configuration in which three layers are stacked, but may have a configuration in which two layers or four or more layers are stacked.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in some embodiments, the leading shield can be omitted in the magnetic recording head. The materials, shapes, and sizes of the components of the disk device are described in the above embodiment, but can also be changed in various way as appropriate.

What is claimed is:

1. A magnetic head comprising:
a main magnetic pole that generates a recording magnetic field;
a write shield disposed adjacent to the main magnetic pole and separated from the main magnetic pole by a write gap;
a first side shield that is disposed on a first side of the main magnetic pole in a track width direction from the main magnetic pole and is separated from the main magnetic pole by a first side gap;
a second side shield that is disposed on a second side of the main magnetic pole in the track width direction from the main magnetic pole and is separated from the main magnetic pole by a second side gap;
a first layer that has a first magnetic relative permeability greater than zero and is disposed in the write gap between the main magnetic pole and the write shield; and
a second layer that has a second magnetic relative permeability greater than zero and is disposed in the first side gap and the second side gap,
wherein the first magnetic relative permeability is smaller than the second magnetic relative permeability,
wherein the first layer comprises a magnetic metal selected from the group consisting of Fe, Co, and Ni, and
wherein the first layer fills the write gap between the main magnetic pole and the write shield.

2. The magnetic head according to claim 1, wherein a difference between the first magnetic relative permeability and the second magnetic relative permeability is 2 henries per meter or more.

3. The magnetic head according to claim 1, wherein the second layer is formed of a magnetic layer.

4. The magnetic head according to claim 1, wherein the second layer comprises a magnetic metal selected from the group consisting of Fe, Co, and Ni.

5. A magnetic head comprising:
a main magnetic pole that generates a recording magnetic field;
a write shield disposed adjacent to the main magnetic pole and separated from the main magnetic pole by a write gap;
a first side shield that is disposed on a first side of the main magnetic pole in a track width direction from the main magnetic pole and is separated from the main magnetic pole by a first side gap;
a second side shield that is disposed on a second side of the main magnetic pole in the track width direction from the main magnetic pole and is separated from the main magnetic pole by a second side gap;
a first layer that has a first magnetic relative permeability and is disposed in the write gap between the main magnetic pole and the write shield; and
a second layer that has a second magnetic relative permeability and is disposed in the first side gap and the second side gap, wherein
the first magnetic relative permeability is smaller than the second magnetic relative permeability, and
wherein the second layer fills the first side gap between the main magnetic pole and the first side shield, and the second layer fills the second side gap between the main magnetic pole and the second side shield.

6. A disk device comprising:
a disk-shaped recording medium; and
a magnetic head comprising:
a main magnetic pole that generates a recording magnetic field;
a write shield disposed adjacent to the main magnetic pole and separated from the main magnetic pole by a write gap;
a first side shield that is disposed on a first side of the main magnetic pole in a track width direction from the main magnetic pole and is separated from the main magnetic pole by a first side gap;
a second side shield that is disposed on a second side of the main magnetic pole in the track width direction from the main magnetic pole and is separated from the main magnetic pole by a second side gap;
a first layer that has a first magnetic relative permeability greater than zero and is disposed in the write gap between the main magnetic pole and the write shield; and
a second layer that has a second magnetic relative permeability greater than zero and is disposed in the first side gap and the second side gap,
wherein the first magnetic relative permeability is smaller than the second magnetic relative permeability, and
wherein the second layer fills the first side gap between the main magnetic pole and the first side shield, and the second layer fills the second side gap between the main magnetic pole and the second side shield.

7. The disk device according to claim 6, wherein a difference between the first magnetic relative permeability and the second magnetic relative permeability is 2 henries per meter or more.

8. The disk device according to claim 6, wherein the first layer comprises a magnetic metal selected from the group consisting of Fe, Co, and Ni.

9. The disk device according to claim 8, wherein the second layer comprises a magnetic metal selected from the group consisting of Fe, Co, and Ni.

10. The disk device according to claim 6, wherein the recording medium includes a soft magnetic layer and a magnetic recording layer that is disposed on the soft magnetic layer and has magnetic anisotropy in a direction perpendicular to a surface of the recording medium.

\* \* \* \* \*